May 28, 1957  G. W. HAAFF  2,793,920
MOUNT FOR ROTARY DRUMS
Filed Dec. 9, 1954  3 Sheets-Sheet 2
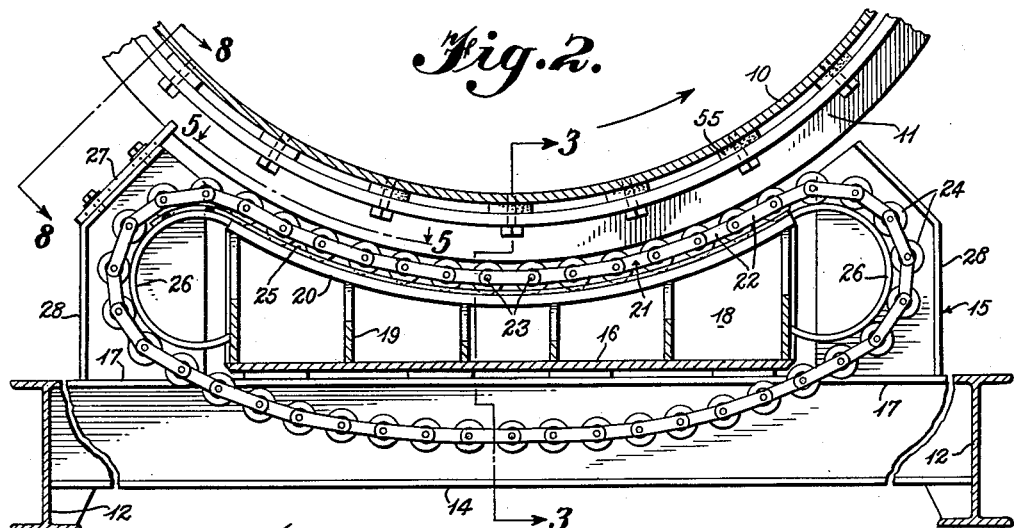
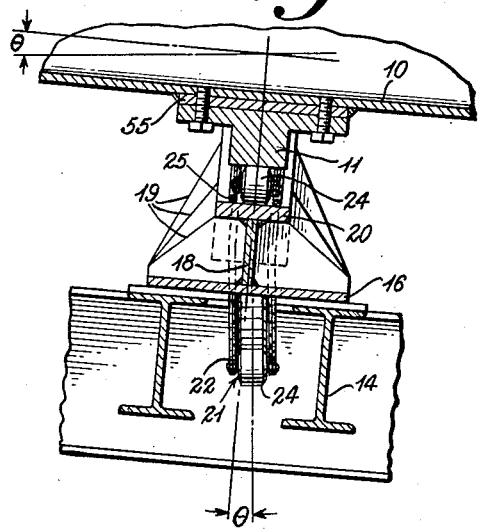
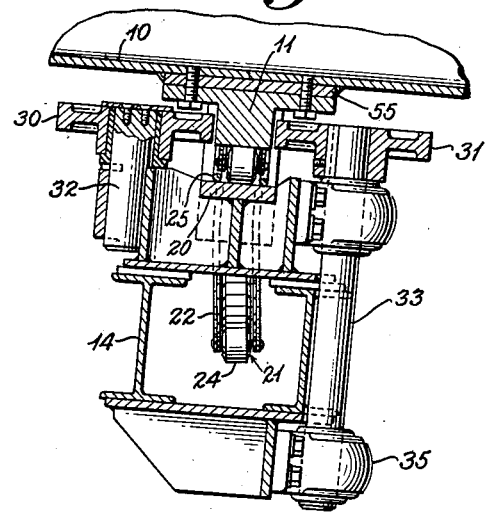
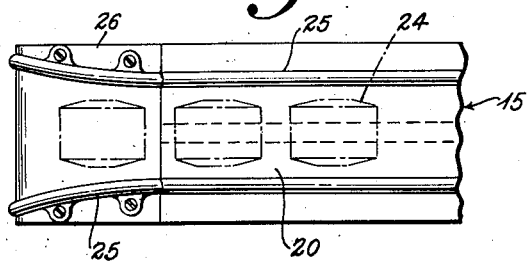

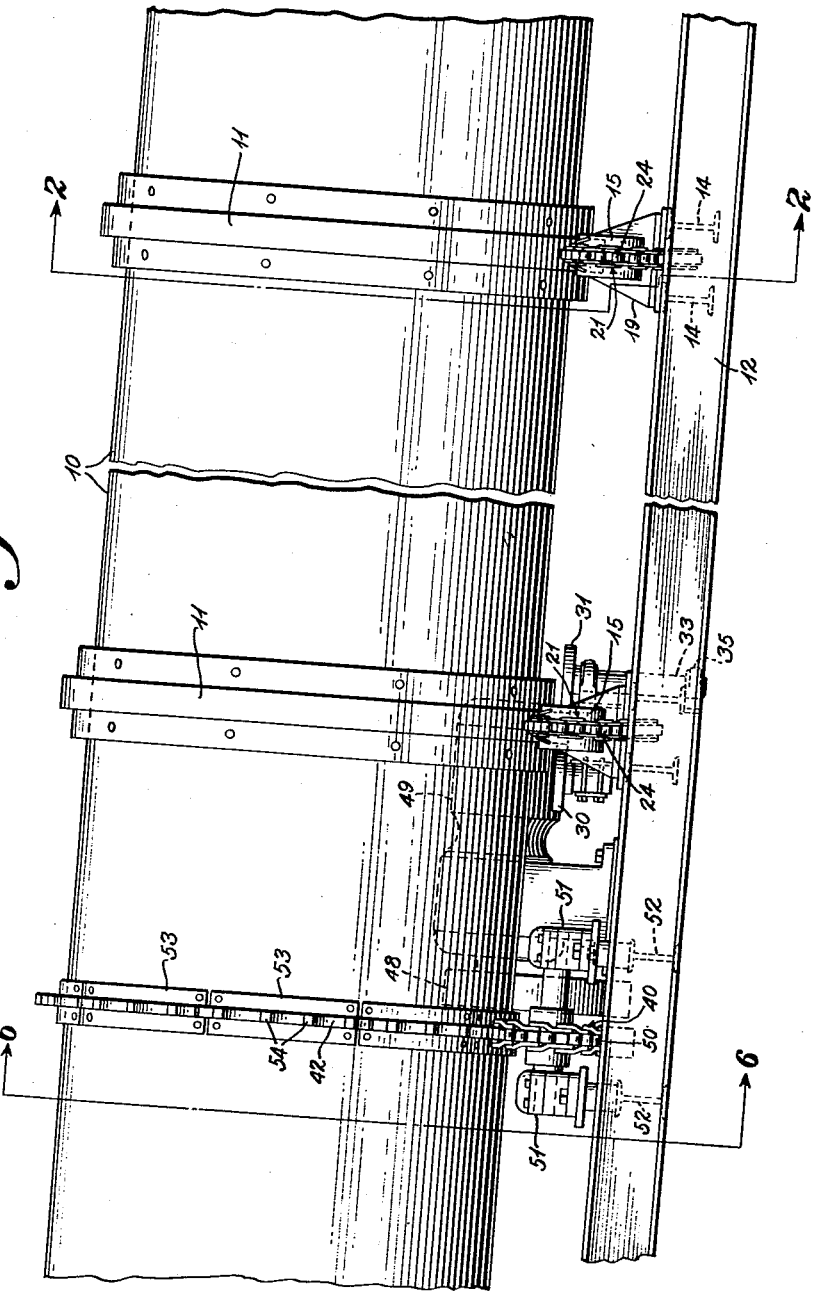

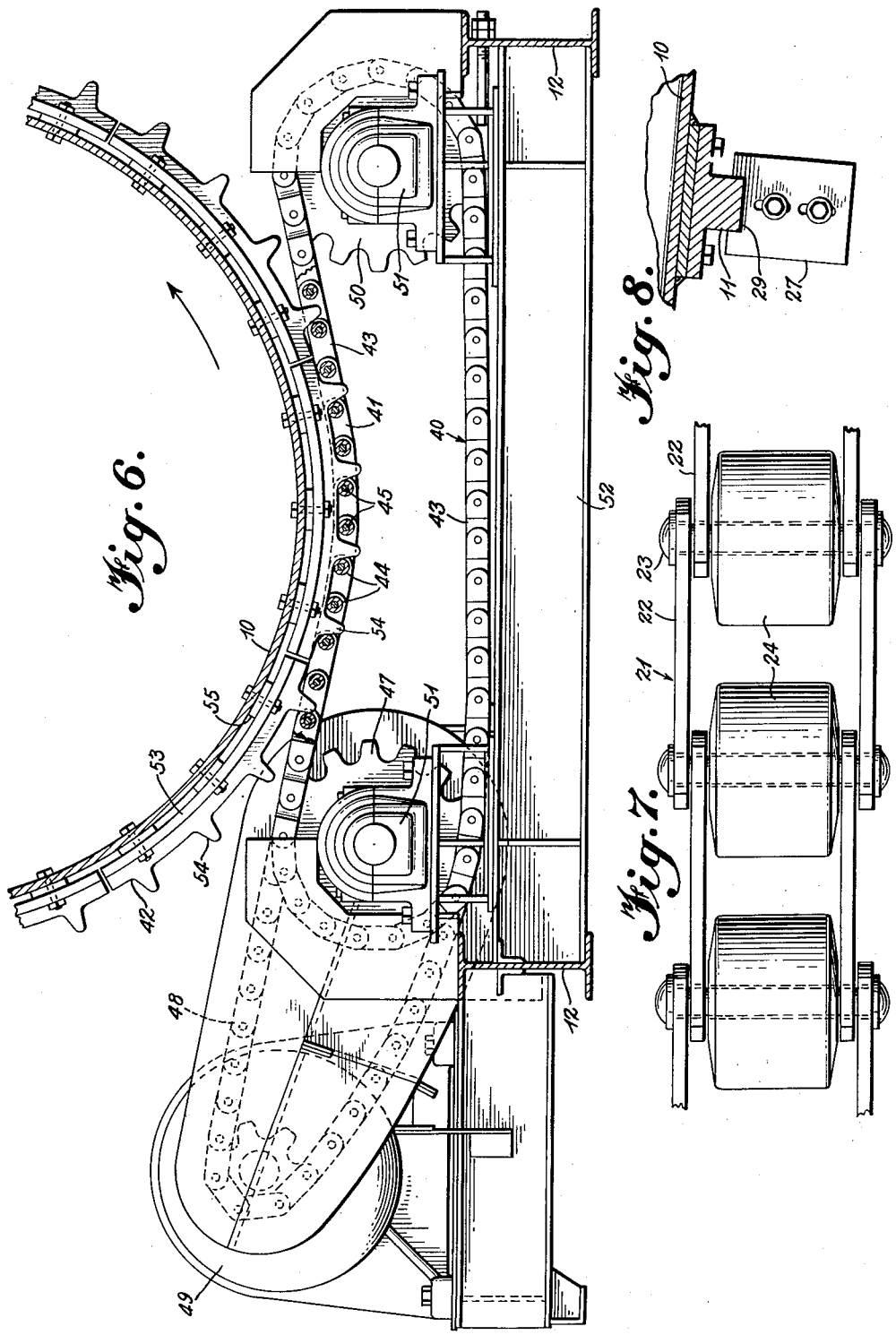

United States Patent Office 2,793,920
Patented May 28, 1957

---

2,793,920

MOUNT FOR ROTARY DRUMS

George W. Haaff, Indianapolis, Ind., assignor to Link-Belt Company, a corporation of Illinois Application December 9, 1954, Serial No. 474,231

1 Claim. (Cl. 308—204)

This invention relates to new and useful improvements in combined mounts and drives for rotatable drums used in the treatment of various flowable solid materials.

An important object of the invention is the provision of mountings, comprising endless roller chains trained around cradle frames to support a drum for free rotation with a limited amount of axial movement in a manner to afford more even distribution of the load upon many rollers; greater saving in the power required to rotate the drum; and to require less supervision, lubrication and maintenance.

Another important object is the provision of a tangential chain and sprocket drive for rotating the drum which enables power to be transmitted to the drum with four or five teeth instead of the one or two tooth contact common to all gears, which reduces backlash to a minimum, is quieter and more positive, and furthermore, when the drum is heated and cooled, the chain drive arrangement compensates for contraction and expansion of the drum so as to produce a quiet smooth drive.

A still further important object is the provision of a combination which includes the aforesaid live roller cradles and the tangential chain and sprocket drive to prevent detrimental vibration and bouncing of the rotating drum upon its supports.

Another object is the provision of a live roller cradle support with means to reduce friction and gauling between the ends of the rollers and their track guides.

Another object is the provision of means for shielding the supporting rollers from foreign material and means for cleaning or doctoring the tires of the drum.

Other objects and advantages of the invention will be apparent during the course of the following description. In the accompanying drawings forming a part of the specification and wherein like numerals are employed to designate like parts throughout the several views:

Figure 1 is a side elevational view of a drum illustrating the improved mounting and drive therefor;

Figure 2 is an enlarged transverse sectional view illustrating more clearly the supporting of the drum upon the live roller cradles;

Figure 3 is a sectional view of the same taken on line 3—3 of Fig. 2;

Figure 4 is a sectional view similar to Fig. 3 but taken at a location to illustrate the thrust rolls employed for permitting limited movement of the drum along its longitudinal axis;

Figure 5 is a fragmentary top plan view of the entrance end of the live roller guide path;

Figure 6 is an enlarged fragmentary transverse sectional view of the drive for the drum and illustrating the horizontal tangential chain and sprocket employed for rotating the drum;

Figure 7 is a top plan of a section of the drum supporting roller chain illustrated in Fig. 2; and Figure 8 is an elevational view of the type of doctor employed for wiping the drum tires.

Referring now to the drawings wherein, for the purpose of illustration and not of limitation, one embodiment of the invention is shown in which the numeral 10 designates a cylindrical drum rotatable about a longitudinal axis which is tilted from the horizontal, whereby material fed into the higher end of the drum will be moved lengthwise thereof to its lower end for discharge of the material. Material passing through the drum may be heated, cooled and/or treated in any desired manner. When the drum is employed for drying material, it is usual to inject hot gases, such as air, into one end of the drum in any conventional manner for heating the material. These drums are of extremely large size and weight and have a very substantial tons per hour capacity. When the material is heated in the drum a temperature of around 350 degrees to 400 degrees Fahrenheit may be provided in the drum with the result that the drum, its tires and the gearing for rotating the drum are subjected to expansion and contraction.

Drums of this type are usually provided with two concentric hardened steel tires, one near each end thereof, for the rotary support thereof. Each drum tire is usually conventionally rotatably supported by a pair of rollers, one on each side of a vertical plane passing through the axis of the drum. This affords a four-point support for the drum. These rollers each have expensive bearings requiring very careful alignment and frequent lubrication and supervision, and are often neglected with the result that frequent expensive repairs and replacement are required.

These drums are conventionally rotated by a concentric ring gear driven by a pinion arranged at one side of the vertical axis of the drum and operated by a motor. These ring gears, due to their large diameter, are usually cast and are fastened to the circumference of the drum.

The present invention differs from the aforesaid conventional support and drive in that the drum is mounted for free rotation with a limited amount of axial movement upon live roller cradles, and is rotatably driven by means of a horizontal tangential chain and sprocket drive.

For this purpose, a suitably inclined base frame or foundation 12 for the rotary support of the drum is provided. Such base frame may be of any desired construction to include structural load bearing horizontal cross beams, each of which may comprise a pair of laterally spaced I-beams 14 to form a support for each live roller cradle 15. Each cradle 15 is a separate unit preferably composed of an anchor plate 16 secured to a pair of the I-beams 14 to span the center of the space therebetween, leaving an open space or slot 17 beyond each end of the anchor plate. Rising from this anchor plate and extending longitudinally at the center thereof is a vertical web plate 18 with triangular laterally extending vertical gusset plates 19 welded thereto and to the anchor plate as illustrated. The top edge of the web is curved on the proper radius to be welded to the longitudinal center of an arcuate track 20 having a curvature symmetrical with the circumference of a tire 11 and having its underside welded to the upper edges of the gussets 19 to form a substantial load bearing support.

Each live roller cradle extends transversely beneath the drum and includes an endless chain 21, see Figs. 2 and 7, composed of a series of side bars 22 joined at their overlapped ends by chain pins 23. On each chain pin is rotatably mounted a roller 24 which has a bearing bore a few thousandths of an inch larger than its pin to have some tolerance or radial play thereon. There is also a similar tolerance allowed between the side bar openings and the chain pins and between the ends of the rollers and the adjacent faces of the inside side bars of the links to allow for a substantial amount of transverse flexibility whereby, as seen in Figs. 1, 3 and 4, the lower, or inactive, runs of these chains, during their free travel beneath their transversely tilted cradle frames, will flex into vertical planes. This affords greater flexibility and ease of adaptability to surfaces contacted, without galling or gouging the parts.

To confine the rollers of the chains to straight paths of travel upon the tracks 20, each of the latter, see Figs. 2 and 5, is provided with a pair of spaced, raised longitudinal guide rails 25 along its longitudinal edges. These guide rails may be continued over the top arcuate portions of track extensions 26 which are welded to the ends of the track plate 20 and to adjacent supports. Each extension 26 is arcuated through about 270 degrees to guide its endless chain in a closed path and is supported with a center web welded thereto and to the gussets or supporting structure as illustrated. The ends of the guide rails 25 at the entrance end of the track 20 and the arcuate extension 26 are flared outwardly and may be made removable for replacement, as shown in Fig. 5, to receive the brunt of the roller end thrust as they guide and maintain the rollers of the upper run rolling true to the center line of the roller track 20.

Each tire 11 is suitably secured to the drum and is rotatably supported upon a live roller cradle 15 and upon about fourteen rollers of the upper run of each chain 21. This number of rollers simultaneously engaging each arcuate track 20 and its tire, distributes the drum load over an arc of about 60 degrees having its center directly beneath the longitudinal center of the drum. As the drum rotates, the frictional engagement between the tires and rollers causes the chains 21 to travel through their endless paths to constantly present successive rollers to bear the drum load, with the upper run of rollers engaging the track 20 and the lower run passing through the slots 17 between the beams 14. Thus, the drum will be so freely rotatably supported near each end on one of the live roller cradles as to result in a tremendous saving of power, which in actual practice has been reduced by about one-third of that required to rotate conventionally mounted drums. It has also been found that the rolling contact of the chain rollers with the tires and tracks under the load sustained will cold work all three of these elements into smooth and polished surfaces so that they improve with use and age. The chain pins and rollers are so ruggedly constructed that they require little or no lubrication, and foreign material is prevented from reaching their surfaces by doctors 27 of flexible leather, or the like, wiping the tires, see Fig. 8, and by guard casings 28 covering the looped ends of the chains. Each tire doctor 27 may be merely a piece of reasonably stiff leather adjustably mounted on the inclined top of one guard casing 28 of each cradle in substantially radial relation to the drum axis and is provided with a slot 29 to fit snugly about its respective tire 11 to remove foreign matter.

In order to permit the inclined drum to partake of only a limited amount of axial movement during rotation and to hold the tires 11 properly positioned relative to their live roller cradles, a pair of thrust rollers 30 and 31 are positioned on opposite sides of the tire nearest the higher end of the drum. These thrust rolls are mounted on vertical shafts 32 and 33 journaled in bearings 34 and 35 suitably secured to opposite sides of the cross beams 14, with the shaft 33 at the lower side of the tire made longer for more substantial bearing support.

The rotary drive for the drum is located at the higher end of the drum adjacent to the tire engaging the thrust rolls. It will be observed that this drive is not the conventional cast ring gear fastened to the circumference of the drum axis with a small pinion located to one side of the drum axis and engaging the ring gear to rotate the drum. In place of this conventional drive, and because the live roller cradles offer such low frictional contact for supporting the freely rotatable drum, it has proven necessary to provide a special drive therefor. It is believed that such special drive is critical for reasons which now appear.

It will be observed that this special drive is of a horizontal tangential chain and sprocket type with the chain 40 arranged horizontally and transversely beneath the drum and having its upper run 41 engaging the sprocket ring 42 secured to the periphery of the drum. This sprocket chain 40 is composed of precision made offset links providing a minimum of backlash and is exceedingly quiet in operation. Each link has the inside end portions of its offset side bars 43 press fitted onto the ends of joint bushings 44 and chain pins 45 passing through the bores of the bushings and the pin holes formed in the outside end portions of the offset side bars pivotally connect the overlapped end portions of adjacent links. The inside end portions of the links are the leading ends, and since the drive and driven sprockets mesh with opposite faces of this chain, each tooth of a drive sprocket 47 will bear against one side of a bushing 44, while the opposite side of this same bushing will be the driver side when engaging a tooth of the driven sprocket 42. Thus, a longer wearing chain results. This tangential drive chain 40 is driven by another sprocket chain 48 from a suitable electric motor 49. The horizontal tangential drive chain 40 passes around an idler sprocket 50 positioned at the far side of the drum and the shafts of the sprockets 47 and 50 are mounted in suitable bearings 51 supported upon an I-beam 52 positioned transversely beneath the drum and supported at its ends on the base frame 12. It will be observed that the upper run of the sprocket chain 40 is slightly arched by the drum contact therewith, thereby causing at least four of the teeth of the drum sprocket 42 to be simultaneously engaged at all times by the chain to uniformly transmit rotary motion without backlash to the drum.

The driven drum sprocket wheel 42 is composed of a series of sprocket segments 53, which may be either cast or cut from plate stock, and each of which is of a length to provide four tapered sprocket teeth 54. Each sprocket segment 53 is mounted on adjustable shims 55 which are bolted from the inside of the drum and after being adjusted to line-up with the various sprocket segments, are welded to the drum.

After the live roller cradles 15 of this application were produced and proven to be more efficient in operation, saving of power and longer lasting without lubrication than the former conventional four roller supports for drums, it was decided to substitute the live roller cradles for the four roller supports in existing installations in the field which had the conventional ring gear and pinion drive. When this substitution was made and the drive was started, a harmonic and periodic vibration of the drum occurred, which caused the drum to actually bounce and vibrate upon these new live roller cradles 15. This action became accelerated with continued rotation of the drum and was so pronounced that it could not be tolerated for fear of incurring considerable damage to the installation and possible injury to the operators. Such queer action of the drum on the superior live roller cradles could not be comprehended, until finally it was conceived that it might be caused by the use of the conventional type of ring gear and pinion drive. In this same installation containing the new live roller cradles, the conventional ring and pinion gear drive was then replaced with the tangential chain and sprocket drive disclosed in this application; and when the drum was rotated with this new chain and sprocket drive, the objectionable vibration and bouncing of the drum disappeared entirely and it rotated with perfect precision smoothness.

Applicant is not at this time sure of the reason for this proven superior operation of the drum with the new live roller cradles combined with the new tangential chain and sprocket drive. Nor is applicant able to definitely state the theory underlying this superior operation. However, it is believed that when a conventional ring and pinion gear drive is employed at one side of the drum, the drive is transmitted to the drum by a one or two teeth contact and in gearing as large as required for these installations, the gears are usually cast products which, due to their inherent tooth irregularities, produce considerable backlash with intermittent slapping action occurring between one or two teeth of the ring and pinion gears. Then, too, this slapping action varies with expansion and contraction of the drum and ring gear; and if the drum is supported in the conventional manner at only the four points at opposite sides of the drum axis, this action apparently sets up a harmonic vibrating action in the drum and causes it to vibrate and bounce upon its supports. In these earlier conventional gear driven drums using only four rollers for the support of the drum, no objectionable vibration and bouncing of the drum was noted, probably due to the wide spacing of the four-point support; but it will be remembered that these four rollers have expensive bearings requiring frequent lubrication to maintain their usefulness and that is one of the main reasons for replacing them with the live roller cradles 15. In many used, where these drums are employed for treating abrasive material such as sand, aggregate and the like, the operators often neglect to lubricate the bearings for the four conventional supporting rollers with the result that they require constant repair and replacement. For such reasons, the more efficient live roller cradles 15 requiring no lubrication are employed to support the drum near each end. This distributes the drum load over about fourteen closely spaced rollers at each end of the drum with seven on each side of the vertical axis, instead of upon only four widely spaced points with four conventional rollers, with the result that the drum is much more free to rotate. Upon substitution of the horizontal tangential chain and sprocket drive for the conventional spur gear drive, the excessive vibration and bouncing of the drum never started. It is, therefore, believed that this tangential chain and sprocket drive produces little or no backlash and its use in conjunction with the new live roller cradle support of the drum is the reason for the superior, quieter and smoother action of the drum, resulting in greater savings in power for rotating these tremendous drums and requires less supervision, lubrication and maintenance of the apparatus. Another reason for this smooth operation is believed to be that the tangential chain and sprocket drive automatically compensates for the contraction and expansion of the drum and sprocket under the extremely variable conditions under which it must operate, and this results in minimizing backlash.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

Having thus described the invention, I claim:

A mounting for a rotary cylindrical drum having a tire extending therearound, comprising a pair of laterally spaced parallel beams, a flat plate spanning and extending longitudinally of a portion of the space between said beams to provide openings at the opposite ends of said plate, a longitudinally curved track, a vertical web plate secured to said flat plate and said track to support the latter, the ends of said track and web plate terminating in vertical alignment with the ends of said flat plate, an arcuate member curved downwardly from each end of the track toward the aforesaid openings at the ends of said flat plate, laterally spaced guide rails extending along the longitudinal edges of the track and its arcuate extension numbers, an endless roller chain trained to travel over the top surfaces of said track and its arcuate extension numbers between their guide rails with its lower run hanging free beneath said flat plate, and two opposed thrust rollers supported for rotation on opposite sides of and above said track with their treads spaced to receive therebetween and to restrict the lateral movement of the mounting tire of said drum when said tire is supported for rotation on the portion of the roller chain traveling along the said track.

References Cited in the file of this patent

UNITED STATES PATENTS

| | | |
|---|---|---|
| 798,886 | Dornfeld | Sept. 5, 1905 |
| 947,337 | Kent | Jan. 25, 1910 |
| 1,423,028 | Roth | July 18, 1922 |
| 1,908,269 | Palmgren | May 9, 1933 |
| 1,925,875 | McLaughlin | Sept. 5, 1933 |
| 1,971,474 | Bartlett | Aug. 28, 1934 |
| 1,981,096 | Dubus | Nov. 20, 1934 |
| 2,010,752 | Dubus | Aug. 6, 1935 |
| 2,404,156 | Abbott | July 16, 1946 |